Nov. 10, 1964 G. M. STAMPS 3,156,766

SONAR TELESCRIBER

Filed June 18, 1962 2 Sheets-Sheet 1

INVENTOR.
GEORGE M. STAMPS
BY Christie, Parker & Hale
ATTORNEYS.

Nov. 10, 1964 G. M. STAMPS 3,156,766

SONAR TELESCRIBER

Filed June 18, 1962 2 Sheets-Sheet 2

INVENTOR
GEORGE M. STAMPS
BY Christie, Parker & Hale
ATTORNEYS.

3,156,766
Patented Nov. 10, 1964

3,156,766
SONAR TELESCRIBER

George M. Stamps, Palos Verdes Estates, Calif., assignor to Telautograph Corporation, Los Angeles, Calif., a corporation of California Filed June 18, 1962, Ser. No. 203,111
9 Claims. (Cl. 178—18)

This invention relates to telescriber equipment for transmitting handwritten messages, and more particularly is concerned with a telescriber utilizing sound waves for sensing movements of the handwriting stylus at the telescriber transmitter.

Telescribing equipment in which handwritten messages are transmitted and reproduced at remote locations is well known. In conventional equipment, the writing stylus at the transmitter is linked by mechanical means to two transducers which translate two coordinates of position of the writing stylus into two corresponding electrical signals. The two electrical signals are then transmitted to the receiver where suitable transducers mechanically position a writing stylus over a writing surface in response to the two signals.

While the mechanical linkage arrangement has proved to be the simplest and most effective way of coupling a written stylus to the transducers for generating the two output signals at the transmitter, mechanical linkages impose certain undesirable limitations on the telescribing equipment. For example, the area over which a mechanical linkage arrangement can effectively operate is limited; otherwise, the linkage becomes too heavy and cumbersome to manipulate. Mechanical linkage may interfere with the normal movements of the writing stylus as operated by a person attempting to use the stylus in the manner of a conventional writing implement. Also, the mechanical linkage system may interfere with the operator's view of the writing surface.

These and other limitations in conventional mechanical linkage arrangements for telescribers have resulted in various arrangements for sensing movement of a writing stylus over a writing surface without any mechanical linkage being tied to the stylus. For example, platens made of resistance or other material that is arranged to produce signals which vary with the point of contact between the stylus and the platen have been proposed. Also, capacitive or inductive sensing of the stylus position has been heretofore proposed. Such known schemes have generally not proved commercially successful because they have either been too costly to implement, they have lacked sufficient accuracy in resolution for reproducing handwriting motions, or they have had severe parallax problems because the sensing of stylus position was not made at the exact point of contact between the stylus and the writing surface.

The present invention is related to an improved arrangement for sensing the position of a stylus movable over a writing surface and translating the position of the stylus into two signals indicative of two coordinates of position of the stylus. Position sensing of the stylus is accomplished by means of periodically pulsed acoustical waves set up within the platen forming the writing surface. The stylus preferably is arranged as the source of the sound waves which radiate outwardly in the platen from the point of contact between the stylus and the platen. Two sensors are positioned at spaced positions on the platen and the time the sound waves pulses take to travel from the stylus to each of the two sensors provides a distance measurement along two coordinate axes from which position information of the stylus is ascertained and converted into analog output signals.

The invention has the advantage that the platen can be made as large or as small as desired without affecting the operation of the overall transmitter system. Furthermore, the platen can be made of a transparent material, such as glass, so that it can be used in the manner of a plotting board or can be used for tracing drawings placed under the platen. Since the exact point of contact of the stylus with the platen is measured, the problem of parallax is eliminated. At the same time the stylus is made completely free of any mechanical linkages and therefore is freely movable by the operator.

For a more complete understanding of the invention, reference should be made to the accompanying drawings, wherein.

Figure 1:
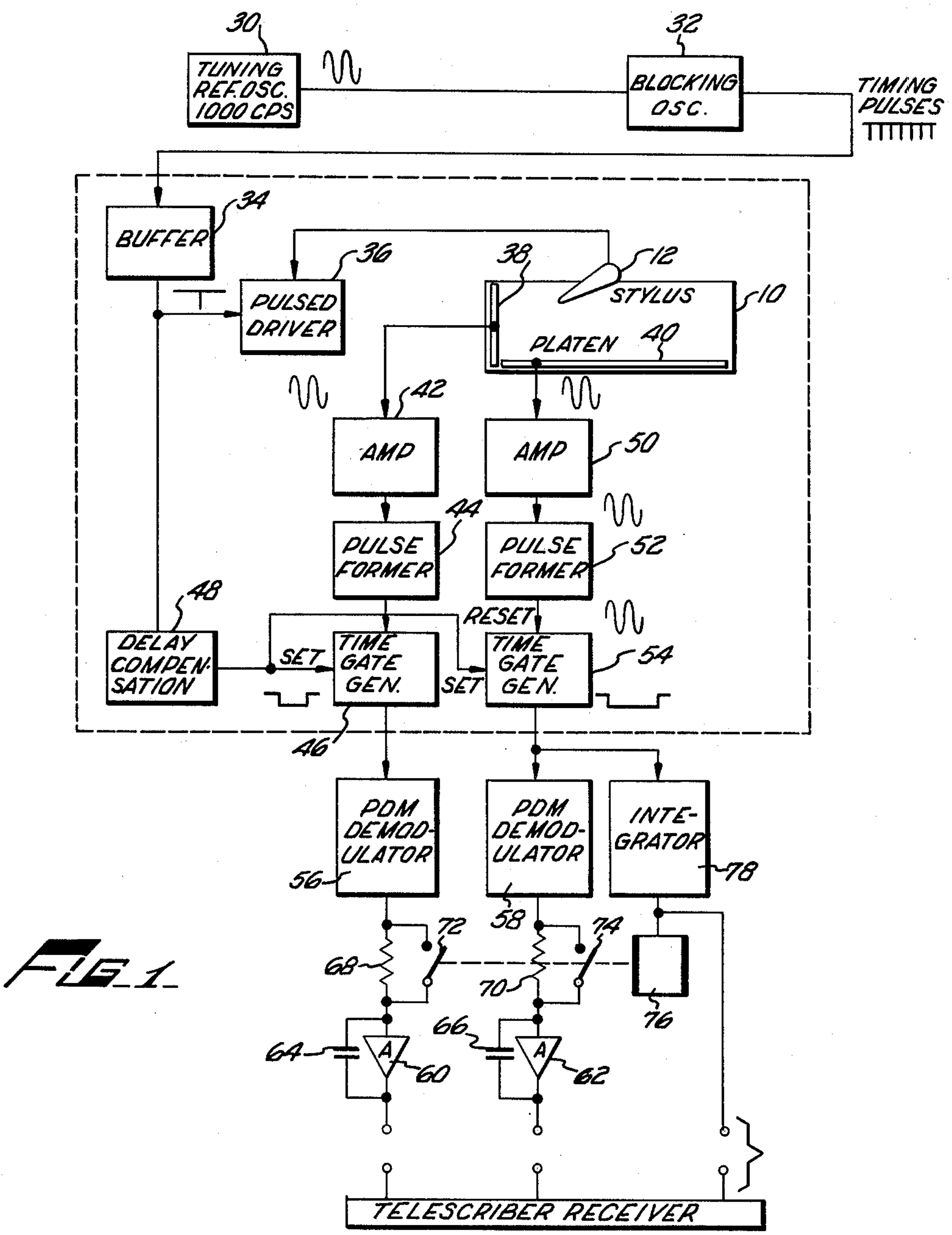
FIGURE 1 is a block diagram of a preferred embodiment of the invention.

Referring to FIGURE 1 in detail, the numeral 10 indicates generally a writing platen. The platen preferably consists of a sheet of transparent glass or other suitable material for propagating high frequency acoustical waves. The platen can be made of any suitable size, depending upon the writing area required. Preferably, the margins of the glass plate forming the platen 10 are tapered and surrounded with sound absorbing material matched in acoustic impedance to the glass to reduce internal reflections of sound waves produced in the glass plate.

Figure 2:
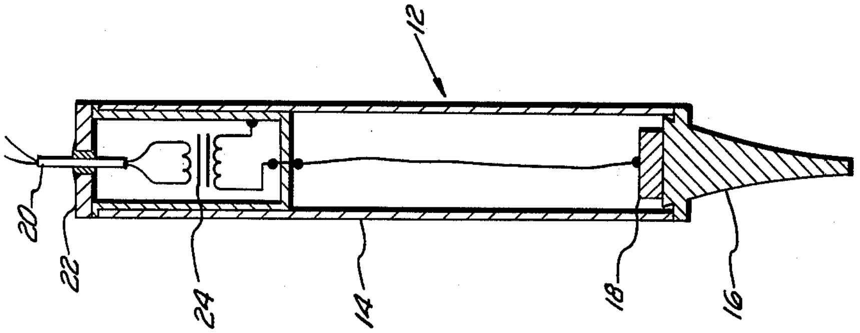
FIGURE 2 is a sectional view of the writing stylus.

"Writing" on the glass plate is done by a manually manipulated stylus 12 which may be constructed in the manner shown in FIGURE 2. The stylus contains a hollow cylindrical case 14 having an exponentially tapered metal writing stylus tip 16. High frequency sound vibrations are carried to the stylus tip from a transducer 18 which may, for example, be a lead zirconate crystal cemented to the stylus tip. The transducer 18 is excited by a signal (generated in a manner hereinafter described) applied through an input cable 20. The cable 20 enters the case 14 through a header 22 and is coupled through an impedance matching transformer 24 to the crystal 18. High frequency supersonic vibrations are set up in the tip 16 by the transducer 18 in response to the applied signals.

The stylus is periodically excited from a reference oscillator 30 (FIG. 1) which is preferably a highly stable oscillator, such as a tuning fork oscillator, having an output frequency of the order of a 1000 cycles per second. The output of the oscillator 30 is converted by means of a blocking oscillator 32 to sharp timing pulses having a repetition frequency equal to that of the oscillator 30. The output of the blocking oscillator 32 is coupled to a buffer circuit 34 providing isolation and impedance matching and then applied to a pulsed driver circuit 36 which includes a power amplifier for driving the transducer 18 in the stylus 12. The driving pulses shown in FIG. 3A produce a mechanical oscillation of the transducer crystal, the crystal being arranged to ring at its resonant frequency for several cycles. See FIG. 3B. The resonant frequency of the transducer crystal 18 is preferably of the order of two megacycles. The techniques of pulsing piezoelectric crystals to generate supersonic vibration is well known.

When the stylus tip is held in firm contact with the surface of the platen 10, the pulsing of the transducer 18 causes ultrasonic sound wave vibrations to be set up in the platen. The acoustic energy is propagated radially in a 360° pattern. While acoustic energy is propagated in several modes, the fastest signal will be that associated with bulk waves, which move with a velocity in glass of about $5 \times 10^5$ centimeters per second. The bulk wave will be followed by additional modes at lower velocities and components of these which may be reflected by the surfaces of the platen. All the waves and reflection damp out between pulses. These acoustic waves, as they radiate out from the point of contact of the stylus, can be detected at two points on the surface of the platen by means of suitable sensing means. By measuring the time it takes the fastest wave to pass from the stylus to the two sensors, the effective distance of the stylus from each of the sensors can be determined giving a measure of position from the stylus in relation to the two sensors.

In the preferred embodiment, rather than using sensors at two fixed points, a series of sensors are arranged in strips along two of the four margins of the platen, as indicated at hand 40. The two sensor strips may consist of a plurality of piezoelectric crystals which respond to the acoustic waves in the glass and produce an electrical output signal. Since the shortest distance between the stylus and each of the two strips is the normal to the X and Y coordinate axes respectively, the measurement of the time interval provides position information in the X—Y coordinate system.

To insure accuracy of the stylus position measurement, it is necessary to make time measurements on the leading edge of the first cycle of the signal pulse produced by the respective sensors 38 and 40. To this end, the output signal (see FIG. 3C) from the X-axis sensor 38 is applied to a high gain amplifier 42, which preferably is designed to saturate on the lowest level of signal normally derived from the first cycle of received energy. The output of the amplifier 42 is coupled to a pulse former circuit 44 which is arranged to differentiate the leading edge of the first half cycle of the signal from the amplifier 42 to form a sharp trigger pulse (see FIG. 3F) which is applied to a time gate generator 46.

Figure 3:
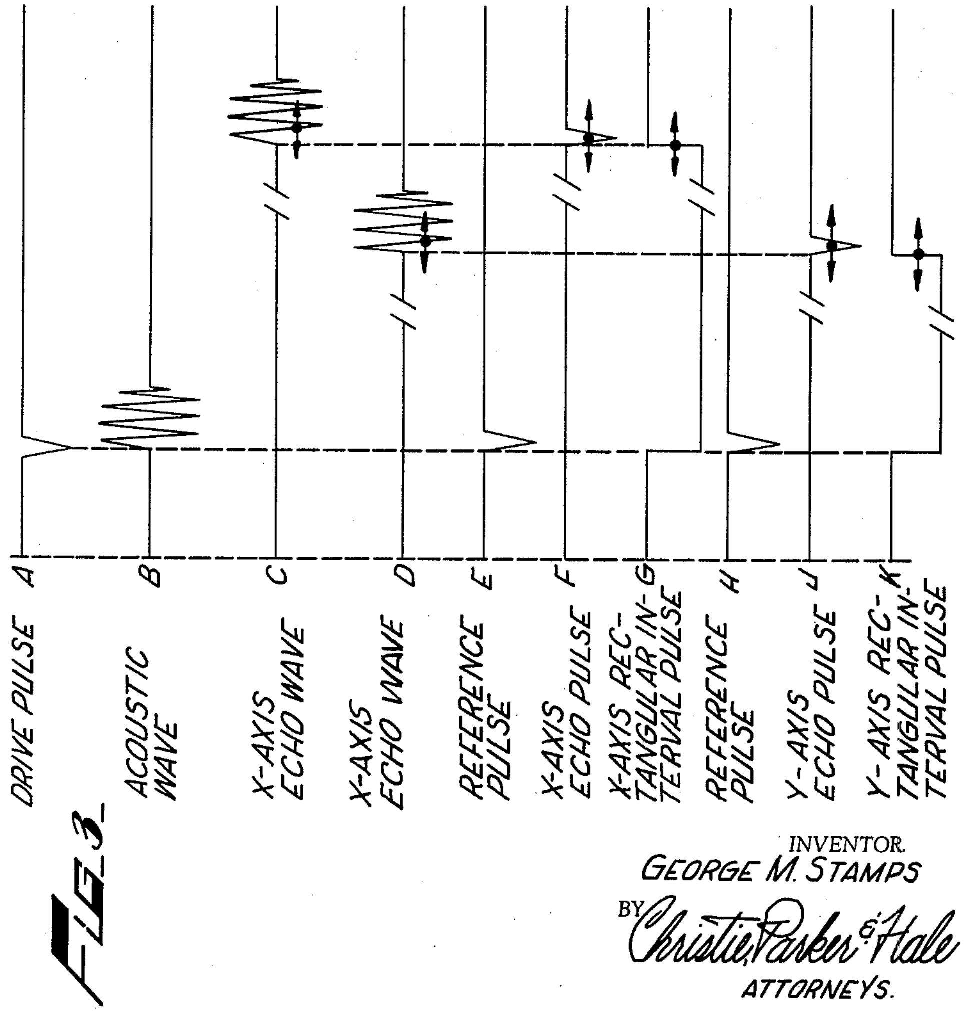
FIGURE 3 is a series of waveforms useful in explaining the operation of the circuit.

The time gate generator 46 is preferably a bistable multivibrator type circuit which is set to one of its stable states in response to a pulse from the output of the buffer 34 after the pulse is delayed by a delay compensation circuit 48. (See FIG. 3E.) The multivibrator 46 is then reset by the output of the pulse former 44. In this way the time gate generator 46 generates a rectangular internal pulse (as shown in FIG. 3G) whose duration is determined by the time interval between the reference pulse derived from the delay compensation circuit 48 and the "echo" pulse derived from the pulse former 44. The reference pulse derived from the delay compensation circuit 48 corresponds in time to the initiation of a sound wave front by the stylus 12 in the platen 40. The echo pulse from the pulse former 44 corresponds to the time at which the wave front first reaches the X-axis sensor 38. Thus, the rectangular output pulse is derived from the time gate generator 46.

In identical fashion the output signal derived from the Y-axis sensor 40 is applied through an amplifier 50 to a pulse former circuit 52 to reset a time gate generator 54. The time gate generator 54 is set in response to the reference pulse drived from the delay compensation circuit 48. (See FIG. 3H, J and K.)

It will be recognized that the output of the respective time gate generators 46 and 54 is a series of rectangular pulses with their leading edge occurring at the pulse repetition rate of the oscillator 30 whose duration varies according to the distance of the stylus from the respective X axis and Y axis sensors 38 and 40. Thus, the output signals of the time gate generators correspond to the well known pulse duration modulation (PDM) type of signal.

In order to derive analogue output signals whose amplitude varies as the distance of the stylus from the respective sensors, the output of the time gate generators 46 and 54 are applied to conventional demodulating circuits 56 and 58 for PDM signals. Demodulators of this type are well known and need not be described here in detail.

The output from the demodulators are amplified through conventional D.C. amplifiers 60 and 62 which are provided with feedback capacitors 64 and 66, respectively. The signals are applied to the D.C. amplifiers through series input resistors 68 and 70 which are shunted by relay-operated switches 72 and 74, respectively. These switches are operated by a relay 76 which is coupled to the output of one of the timing gates through an integrator circuit 78. Thus, as long as pulses are derived from the gate generators, indicating that the stylus is in contact with the platen, the integrator 78 provides an output signal which holds the relay closed, causing the resistors 68 and 70 to be shorted out by the switches 72 and 74 respectively. In this condition, the time response of the amplifier 60 and 72 is high enough to accommodate the frequencies normally encountered in handwriting. However, when the stylus is lifted off the platen, the relay 76 drops out opening the switches 72 and 74 and providing a high input impedance to the amplifiers 60 and 62. As a result, the charge on the feedback capacitors 64 and 66, which are of a type having very low leakage, clamps the output of the amplifiers at their existing level for a substantial period of time. In this manner, whenever the stylus is momentarily lifted off the platen, the output signals from the amplifiers 60 and 62 are held at their existing amplitude levels. This is necessary to prevent the stylus at the receiver from jumping whenever the stylus at the transmitter is momentarily lifted from the platen.

The output of the integrator 78 also provides a "pen lift" signal which can be transmitted to the telescriber receiver to control the lifting of the stylus off the paper at the receiver. The output signals thus derived from the amplifiers 60 and 62 and the integrator 78 may be applied to a conventional telescriber receiver, for example, to reproduce the movements generated by the operator in moving the stylus 12 over the surface of the platen 10.

What is claimed is:

1. A telescriber unit for generating a pair of output signals having a characteristic that varies as a function of the change in two coordinates of position of a stylus over a writing area, said unit comprising a platen of acoustically conductive material, the stylus being movable over the surface of said platen, a first acoustical transducer mounted in the stylus and acoustically coupled to the platen when the stylus is in contact with the platen, second and third acoustical transducers coupled to the platen adjacent the margins of the platen, the transducers being spaced from each other, a periodic reference signal source, means for electrically exciting said first transducer from the reference signal to produce sound waves in the platen, means for sensing the resulting signal generated by the second transducer and comparing the time relation of the reference signal and said resulting signal, means responsive to the sensing and comparing means for generating a first output signal having a characteristic that varies as functions of the time relation between the two signals compared, means for sensing the resulting signal produced by the third transducer and comparing the time relation between the reference signal and said resulting signal, and means responsive to said last-mentioned sensing and comparing means for generating a second output signal having a characteristic that varies as a function of the time relation between the two signals compared.

2. Apparatus as defined in claim 1, including means for sensing when the stylus is in contact with the platen and generating a signal indicating that the stylus is in contact with the platen, and means responsive to said sensing and signal generating means for automatically sustaining said characteristics of the first and second output signals at their existing levels whenever the stylus is removed from contact with the platen.

3. Apparatus as defined in claim 1 wherein said means for generating the first and second output signals includes means for varying the voltage amplitude characteristic of said output signals.

4. A telescriber transmitter comprising a platen of acoustically conductive material, first and second acoustical pick-up transducers coupled to the platen at separated positions, a movable stylus having a point engageable with the surface of the platen, means periodically vibrating the point of the stylus for producing sound waves in the platen, means responsive to the vibrating means and the first and second transducers for generating first and second signals respectively having a measurable characteristic which varies as a function of the time intervals between the time the point is vibrated and each of the pick-up transducers are excited.

5. A telescriber transmitter comprising a platen of acoustically conductive material, three transducers acoustically coupled to the platen, one transducer being movable with relation to the other two transducers, means exciting the movable transducer by a reference signal to generate sound waves in the platen, the other two transducers generating first and second information signals in response to said sound waves, means for comparing the time relation between the reference signal and each of said first and second information signals, and means responsive to said comparing means for generating first and second output signals having characteristics which vary respectively as a function of the time relation between the reference signal and the two information signals.

6. A telescriber comprising a glass plate, a stylus movable over the surface of the plate and having a tip engageable with the plate, means for periodically vibrating the tip at a supersonic frequency, the tip mechanically inducing supersonic waves in the glass plate travelling radially outwardly from the point of contact of the tip, first and second transducer means contacting the plate respectively adjacent to and along the full length of two mutualy perpendicular margins of the plate, means responsive to the output of the first transducer means and synchronized with the periodic tip vibrating means for generating a first signal indicative of the shortest time of travel of the supersonic waves from the tip to the nearest portion of the first transducer means, and means responsive to the output of the second transducer means and synchronized with the periodic tip vibrating means for generating a second signal indicative of the shortest time of travel of the supersonic wave from the tip to the nearest portion of the second transducer means.

7. Apparatus as defined in claim 6 wherein said first and second signal generating means each include a bistable device, means for setting the bistable device to one stable state each time the tip is set into vibration to produce a supersonic wave in the plate and means for resetting the bistable device to its other stable state each time the associated transducer means receives and senses the supersonic wave produced by the vibrating tip, whereby the bistable device is set to said one stable state for time interval determined by the transit time of the supersonic wave in going from the tip to the transducer means.

8. A telescriber comprising a platen of acoustically conductive material, a stylus having a point movable over and in contact with the surface of the platen, means including a transducer in the stylus and a transducer at a fixed position of the platen for transmitting an acoustic wave through the platen betwen the point of the stylus and said fixed position, means coupled to the two transducers for generating a first output signal indicative of the transmission time of the acoustic wave between the two transducers, means including the transducer in the stylus and a transducer at a second fixed position of the platen for transmitting an acoustic wave through the platen between the point of the stylus and said second fixed position, and means coupled to the last-mentioned two transducers for generating a second output signal indicative of the transmission time delay between the sending and receiving of the acoustic wave between said last-mentioned two transducers.

9. A telescriber unit comprising a platen of acoustically conductive material, a stylus movable on the surface of the platen, means for periodically pulsing acoustic waves in the platen, means for sensing the time of travel of an acoustic wave in the platen between the position of the stylus on the platen and a first other position on the platen and generating a first signal having a characteristic which varies as a function of the travel time, means for sensing the time of travel of an acoustic wave between the position of the stylus on the platen and a second other position on the platen and generating a second signal having a characteristic which varies as a function of the travel time.

References Cited in the file of this patent

UNITED STATES PATENTS

| | | |
|---|---|---|
| 2,241,544 | Dreyer | May 13, 1941 |
| 2,586,160 | Handel | Feb. 19, 1952 |
| 2,925,467 | Becker | Feb. 16, 1960 |